United States Patent Office 3,358,878
Patented Dec. 19, 1967

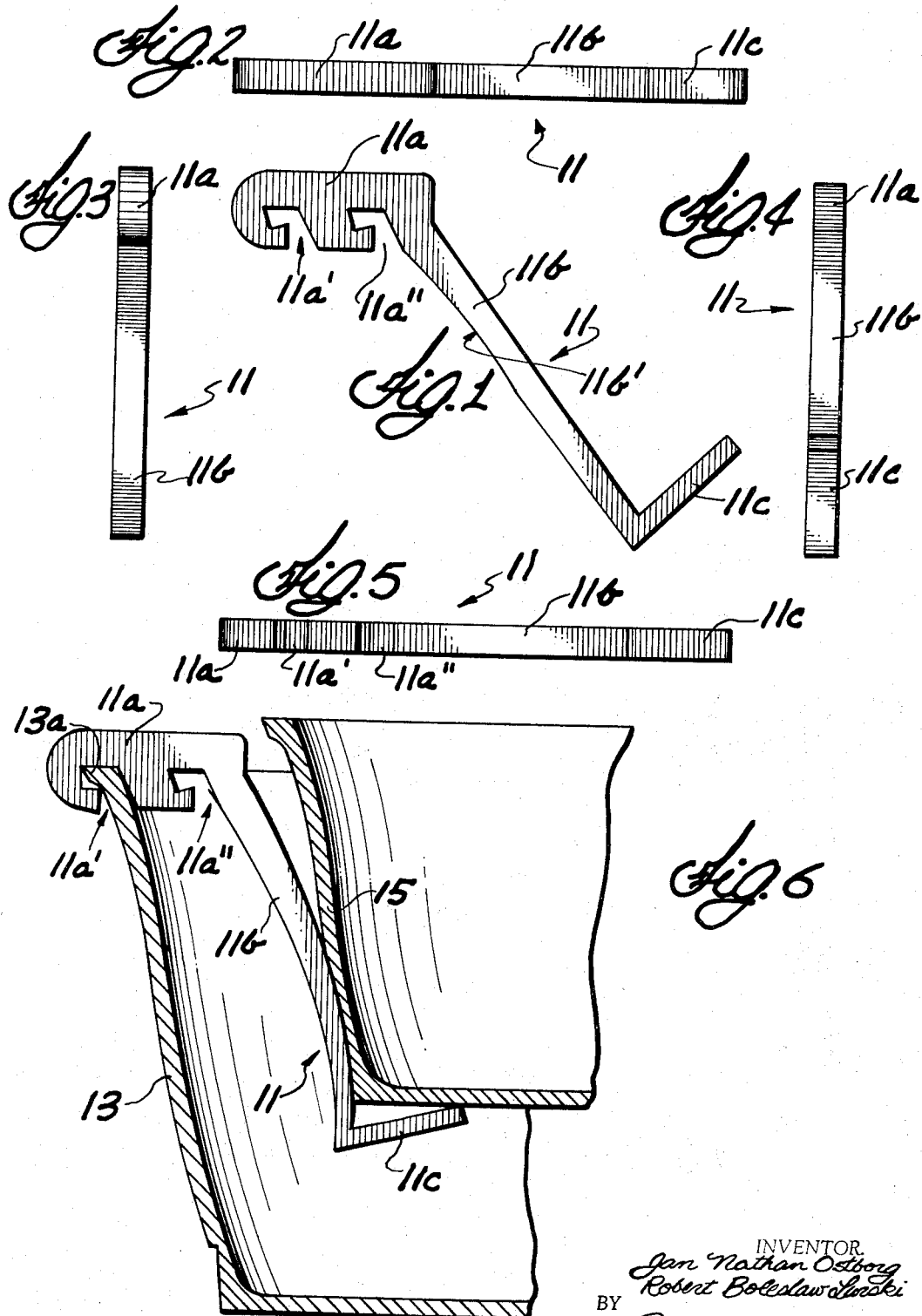

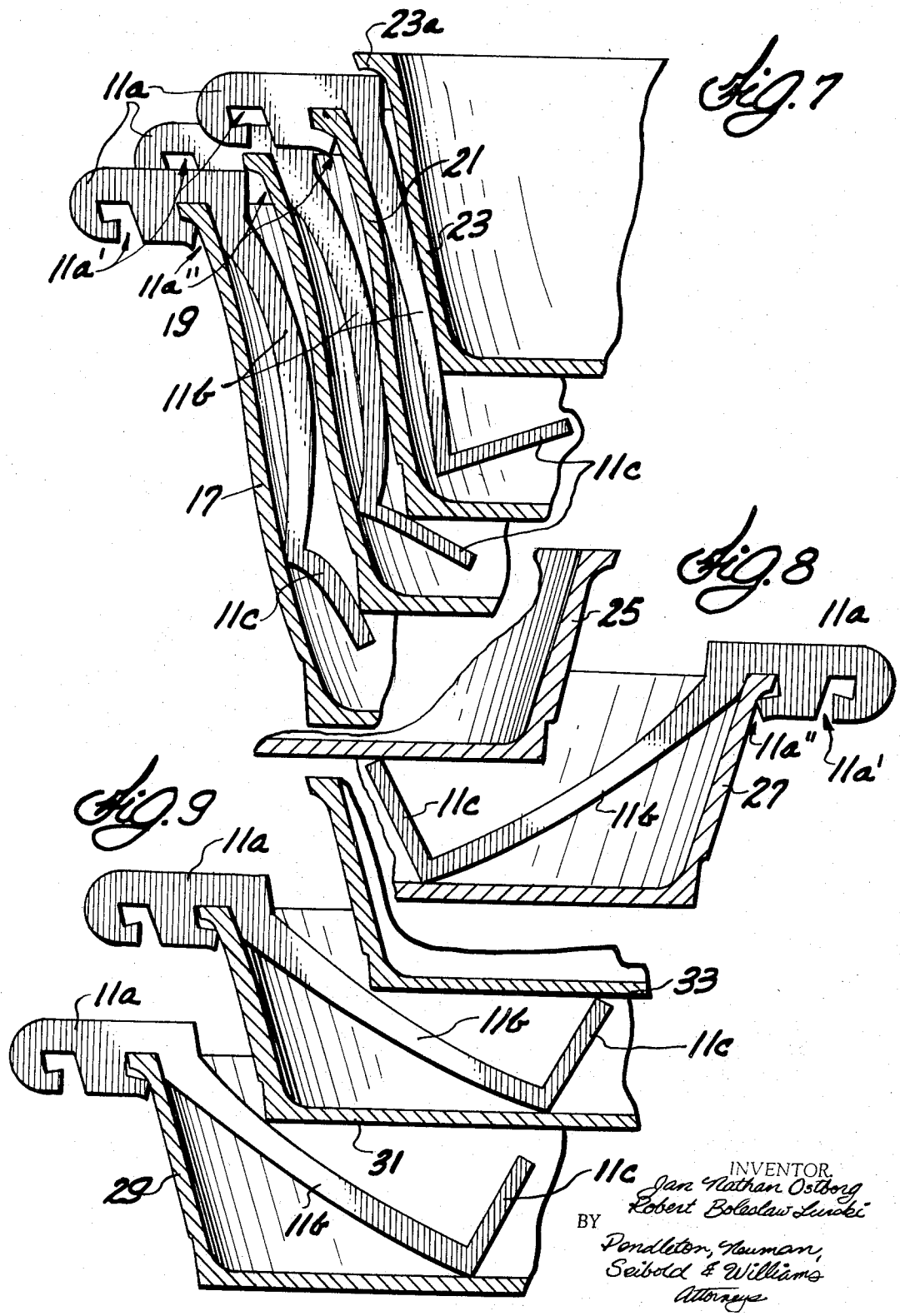

3,358,878
NESTING ACCESSORY
Jan Nathan Ostborg, Lombard, and Robert Boleslaw
Lurski, Chicago, Ill., assignors to Club Aluminum
Products Company, La Grange Park, Ill., a corporation
of Illinois
Filed Oct. 14, 1965, Ser. No. 495,989
2 Claims. (Cl. 220—97)

ABSTRACT OF THE DISCLOSURE

The nesting accessory is used to protectively separate articles such as cookware having surfaces readily subject to damage and comprises a body portion apertured to receive an edge of the article, an elongated leg portion depending at an acute angle from the body portion, and a foot portion extending from the leg portion in a direction away from the body portion.

---

The present invention relates to a nesting accessory and, more specifically, relates to a nesting accessory for separating stacked cookware or the like.

A primary object of the present invention is to provide a new and improved nesting accessory. More specifically, it is an object to provide a new and improved nesting accessory for separating stacked cookware or the like. A further object is to provide a new and improved nesting accessory which will not harm or damage the articles separated thereby, such as cookware having an inner Teflon coating.

Another object is to provide a new and improved stable nesting accessory which will accommodate articles, such as cookware, having various depths and diameters. Additionally, it is an object to provide such a nesting accessory which may readily be fixed in place on articles to be separated thereby.

Still another object is to provide such a nesting accessory which is pliable and nonmetallic so that articles separated thereby may be stacked in compact relationship without fear of damage.

An additional object is to provide such a nesting accessory which is sanitary and inert.

A general object is to provide a new and improved nesting accessory characterized in its economy and longevity.

Other objects and advantages of the invention will become apparent upon reading the attached detailed description taken in conjunction with the drawings.

In one form of the present invention, a nesting accessory is provided for separating stacked articles, such as cookware or the like, which includes an upper article edge-engaging portion, an elongated leg portion depending from the edge-engaging portion and having a prescribed angular relationship therewith, and a foot portion extending from the leg portion in a direction away from the edge-engaging portion. The portions of the nesting accessory may be formed of a pliable material and may be integrally formed. A plurality of such nesting accessories are positioned in place around the periphery of an article, such as a saucepan or frypan, and another article may then be stacked on the accessories.

For the purpose of providing a detailed description of the present invention reference will now be made to the drawings wherein:

FIG. 1 is a side elevational view of a nesting accessory constructed in accordance with the teachings of the present invention;

FIG. 2 is a top view of the nesting accessory shown in FIG. 1;

FIG. 3 is a left end view of the nesting accessory shown in FIG. 1;

FIG. 4 is a right end view of the nesting accessory shown in FIG. 1;

FIG. 5 is a bottom view of the nesting accessory shown in FIG. 1;

FIG. 6 is a fragmentary sectional view illustrating the use of nesting accessories corresponding to that shown in FIGS. 1–5 for separating a pair of stacked saucepans or the like;

FIG. 7 is a fragmentary sectional view illustrating the use of nesting accessories corresponding to that shown in FIGS. 1–5 for separating a plurality of stacked saucepans or the like;

FIG. 8 is a fragmentary sectional view illustrating the use of nesting accessories corresponding to that shown in FIGS. 1–5 for separating a pair of stacked frypans or the like; and FIG. 9 is a fragmentary sectional view illustrating the use of nesting accessories corresponding to that shown in FIGS. 1–5 for separating a plurality of stacked frypans or the like.

While the invention has been shown and will be described in some detail with reference to a particular exemplary embodiment thereof, there is no intention that it be limited to such detail. Quite to the contrary, it is intended here to embrace all modifications, alternatives and equivalents falling within the spirit and scope of the invention as defined by the appended claims. For the purpose of describing the nesting accessory constructed in accordance with the teachings of the present invention, the nesting accessory will be described in conjunction with separating stacked cookware or the like. However, it will be readily apparent that it is merely illustrative of one use for the nesting accessory constructed in accordance with the teachings of the present invention, and that the nesting accessory may be utilized for separating various stacked articles.

Referring now to the drawings and, more specifically, to FIGS. 1–5, a nesting accessory 11 is shown which is constructed in accordance with the teachings of the present invention and which is adapted to separate compactly stacked articles, such as cooking saucepans and frypans, without damaging such articles. The nesting accessory 11 has a body portion 11a which is adapted to engage the upper edge of an article so that the nesting accessory is suspended from the upper edge, an elongated leg portion 11b depending from the body portion 11a and having a prescribed angular relationship therewith, and a foot portion 11c extending from the leg portion 11b in a direction away from the body portion 11a. In the exemplary arrangement, the body portion 11a has a pair of spaced apertures 11a′ and 11a″ formed therein which are adapted to individually and independently fit over and receive the upper edge of an article so that the nesting accessory 11 is suspended from or hangs from the upper edge of the article. Additionally, in the exemplary arrangement, the leg portion 11b is disposed at an acute angle with respect to the body portion 11a. Finally, the exemplary foot portion 11c is formed to be shorter than the leg portion 11b and extends from the extremity of the leg portion at a prescribed angle with respect thereto (approximately a right angle) in a direction away from the body portion 11a. The portions 11a–11c of the nesting accessory 11 are preferably integrally formed of a pliable, nonmetallic material, such as polyethylene No. PE114 manufactured by the Rexall Chemical Company which has a density of 925.

Referring now to FIG. 6, a nesting accessory 11 constructed in accordance with the teachings of the present invention is illustrated in position for separating a pair of saucepans 13 and 15. In this arrangement, the diameter of the saucepan 13 is substantially greater than the diameter of the saucepan 15. Consequently, the outermost aperture 11a' of the nesting accessory 11 is fitted over or peeled onto the upper edge 13a of the saucepan 13 so that the nesting accessory is supported by or hangs from the upper edge 13a. It will be readily apparent that, in actual practice, a plurality of nesting accessories 11 are fitted onto the upper edge 13a of the saucepan 13 around the periphery thereof. When the saucepan 15 is initially positioned in place, the bottom periphery thereof engages the leg portion 11b of each nesting accessory. With the nesting accessories being formed of a pliable material, the saucepan 15 may then be pressed down into the position shown in FIG. 6 wherein the bottom thereof is engaged by the foot portion 11c of each nesting accessory 11 and the side wall thereof is engaged by the leg portion 11b of each nesting accessory. Under these latter conditions the leg portion of each nesting accessory is bowed slightly as shown in FIG. 6. In view of the foregoing, it will be apparent that nesting accessories 11 constructed in accordance with the teachings of the present invention allow for stacking a pair of saucepans 13 and 15 so that they are not in engagement.

Referring to FIG. 7, an arrangement similar to that shown in FIG. 6 is illustrated wherein four stacked saucepans 17, 19, 21 and 23 having different diameters are separated by nesting accessories 11 constructed in accordance with the present invention. In this arrangement, the diameters of the saucepans are more closely related than the saucepans shown in FIG. 6 so that the innermost aperture 11a'' of the body portion 11a of each nesting accessory is slipped or peeled over the upper edge of the associated saucepan so that the nesting accessory is supported by or hangs from the upper edge. It will again be apparent that a plurality of nesting accessories 11 are fitted around the upper edge of each saucepan into which another saucepan is to be nested. When the saucepans are initially nested one within the other, the bottom periphery of each saucepan engages the leg portion 11b of each associated nesting accessory. Again, with the nesting accessories being formed of a pliable material, the saucepans may be pressed downwardly into compact stacked relationship, as shown in FIG. 7. To accommodate such compact stacking, the nesting accessories on the various saucepans are positioned on the upper edges thereof in staggered relationship. In the exemplary arrangement of FIG. 7, the saucepan 23 is illustrated with a relatively shallow depth so that, when the saucepans are pressed downwardly into compact stacked relationship, the upper edge 23a of the saucepan 23 engages the body portion 11a of each associated nesting accessory 11, but does not engage the foot portion 11c thereof. Consequently, the saucepan 23 is suspended from and partially supported by the body portions 11a of the associated nesting accessories, the saucepan also being partially supported by the leg portions 11b which are engaged thereby. On the other hand, the saucepans 19 and 21 have greater depths so that the foot portions 11c of the associated nesting accessories are engaged thereby as with the arrangement of FIG. 6.

Referring to FIGS. 8 and 9, arrangements are shown which are similar to the arrangements of FIGS. 6 and 7, but wherein frypans 25 and 27 and frypans 29, 31, and 33 are separated by nesting accessories 11 constructed in accordance with the present invention. In these arrangements, the innermost apertures 11a'' of the disclosed nesting accessories are slipped or peeled over the upper edges of the frypans within which other frypans are to be nested. When the nesting accessories 11 are utilized in conjunction with frypans, it will be seen that the inner, bottom surfaces of the frypans, upon which the nesting accessories are supported, are engaged by the leg portion 11b at the extremity thereof. Moreover, when the diameter of a frypan to be nested within another frypan is substantially smaller than the diameter of the other frypan, as shown in FIG. 8, it will be seen that the nested frypan is supported merely on the foot portions 11c of the associated nesting accessories. On the other hand, if the diameters of the nested and nesting frypans are more closely related, as shown in FIG. 9, the nested frypans may be supported on the leg portions 11b alone or on the leg portions 11b and the foot portions 11c of the associated nesting accessories.

The nesting accessory 11 shown in FIGS. 1–5 is drawn to the actual scale of an exemplary model. The exemplary nesting accessory has a thickness as viewed in FIGS. 2–4 of ¼''. The body portion 11a has a length of approximately 1$^{11}\!/_{32}$'' and a width of approximately ⅝''. The leg portion 11b has a length of approximately 3$^{3}\!/_{16}$'' and has a curved portion formed at 11b' which has a radius of approximately 8$^{21}\!/_{32}$'' and which facilitates bending or bowing of the leg portion. The foot portion 11c has a length of approximately 1'' and a width of approximately $^{9}\!/_{64}$''. Finally, the leg portion 11b depends from the body portion at an angle of approximately 53°, whereas the foot portion 11c extends from the leg portion 11c at an angle of approximately 84°.

In view of the foregoing, it will be seen that a stable nesting accessory has been provided for use in separating stacked articles, such as cookware or the like, which will accommodate nested and nesting articles having various depths and diameters. Moreover, it will be seen that the nesting accessory constructed in accordance with the teachings of the present invention may be readily affixed to a selected article. Additionally, the nesting accessory 11 may be constructed of a nonabsorptive material so that it will be sanitary. Since the nesting accessory constructed in accordance with the teachings of the present invention is preferably formed of a pliable, nonmetallic material, such as polyethylene, it will be readily apparent that a plurality of articles, such as saucepans and frypans may be stacked in compact relationship without fear of damage thereto. This is particularly advantageous for cookware having a Teflon lining or the like which is readily subject to damage. In connection with the pliable construction of the nesting accessory, it will be apparent that the material thickness and configuration thereof must be related with the weight and configuration of the utensils to be separated thereby in order to allow for compact stacking. It will also be readily apparent that the nesting accessory will have long life and may be constructed to be inert.

What is claimed is:

1. A nesting accessory for separating stacked articles having upper edges, comprising a body portion having a plurality of spaced apertures formed therein for engaging an upper article edge so that the nesting accessory hangs from the upper edge, an elongated leg portion depending from the body portion at an acute angle with respect thereto, and a foot portion shorter than the leg portion and extending from the extremity thereof in a direction away from the body portion, the portions being integrally formed of a pliable, nonmetallic material.

2. A nesting accessory for separating stacked articles having upper edges, comprising a body portion having a pair of spaced apertures formed therein for individually and independently receiving an upper article edge so that the nesting accessory hangs from the upper edge, an elongated leg portion depending from the body portion at an acute angle with respect thereto, and a foot portion shorter than the leg portion and extending from the leg portion at a prescribed angle with respect thereto in a direction away from the body portion, the portions being integrally formed of a pliable, nonmetallic material.

References Cited

UNITED STATES PATENTS

| | | | |
|---|---|---|---|
| 2,565,782 | 8/1951 | Rhodes | 220—97 X |
| 2,657,559 | 11/1953 | Berg | 220—23.83 |

THERON E. CONDON, *Primary Examiner.*

GEORGE E. LOWRANCE, *Assistant Examiner.*